United States Patent [19]
Sato

[11] 3,743,816
[45] July 3, 1973

[54] RESISTANCE-TYPE SPOT WELDING MACHINE

[76] Inventor: Ryoda Sato, 1-8-25, Ohama-cho, Amagasaki-shi, Hyogi-ken, Japan

[22] Filed: Oct. 12, 1971

[21] Appl. No.: 188,254

[52] U.S. Cl................................. 219/86, 219/116
[51] Int. Cl............................................. B23k 11/10
[58] Field of Search...................... 219/116, 87, 88, 219/89, 108, 78, 80, 119, 86

[56] References Cited
UNITED STATES PATENTS

| | | | |
|---|---|---|---|
| 2,859,330 | 11/1958 | White | 219/89 |
| 3,125,668 | 3/1964 | Eisenburger et al. | 219/87 |
| 2,193,977 | 3/1940 | Martin | 219/89 |
| 3,018,359 | 1/1963 | Roboski | 219/89 |
| 2,969,453 | 1/1961 | Page | 219/87 |

FOREIGN PATENTS OR APPLICATIONS

| | | | |
|---|---|---|---|
| 1,376,753 | 9/1964 | France | 219/87 |

Primary Examiner—J. V. Truhe
Assistant Examiner—B. A. Reynolds
Attorney—Cecily L. Frey

[57] ABSTRACT

Since the operative distances on conventional resistance-type spot welding machines are basically unchangeable, a constant impedance has to be used. When no large operative space is in fact required for welding, such as with articles of small dimensions, power consumption becomes unnecessarily large. The present invention permits to reduce power loss as far as possible by adjusting the depth and/or distance of the operative welding space, to provide an adequate space which depends on the dimensions of the articles to be welded, so as to be operative at minimum impedance and thus maximum power factor.

7 Claims, 15 Drawing Figures

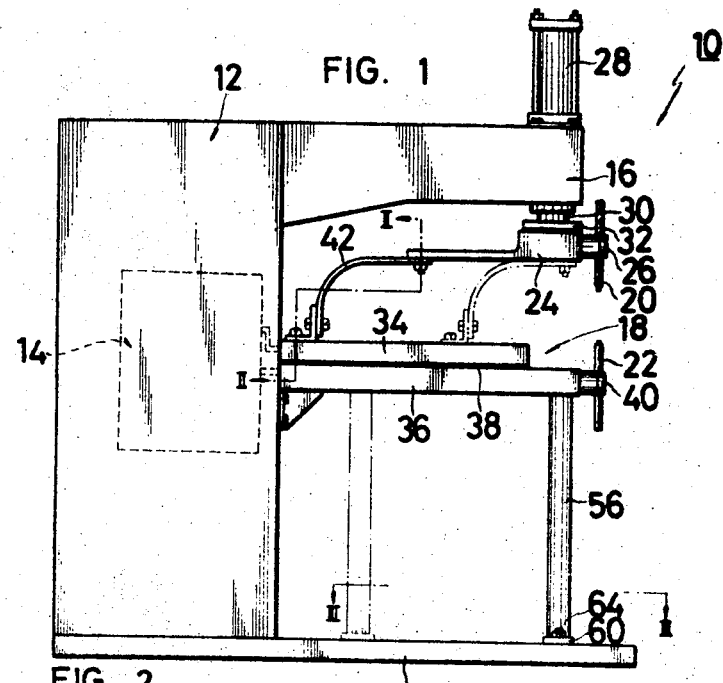
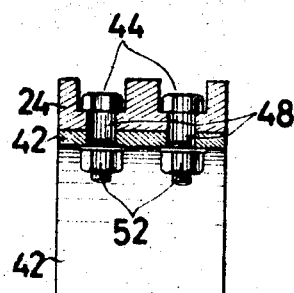
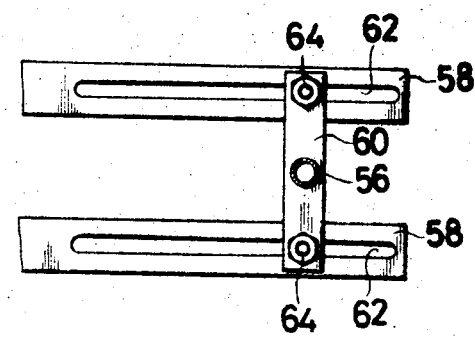
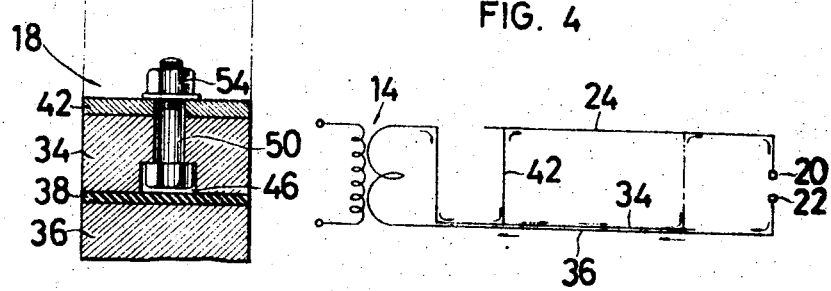

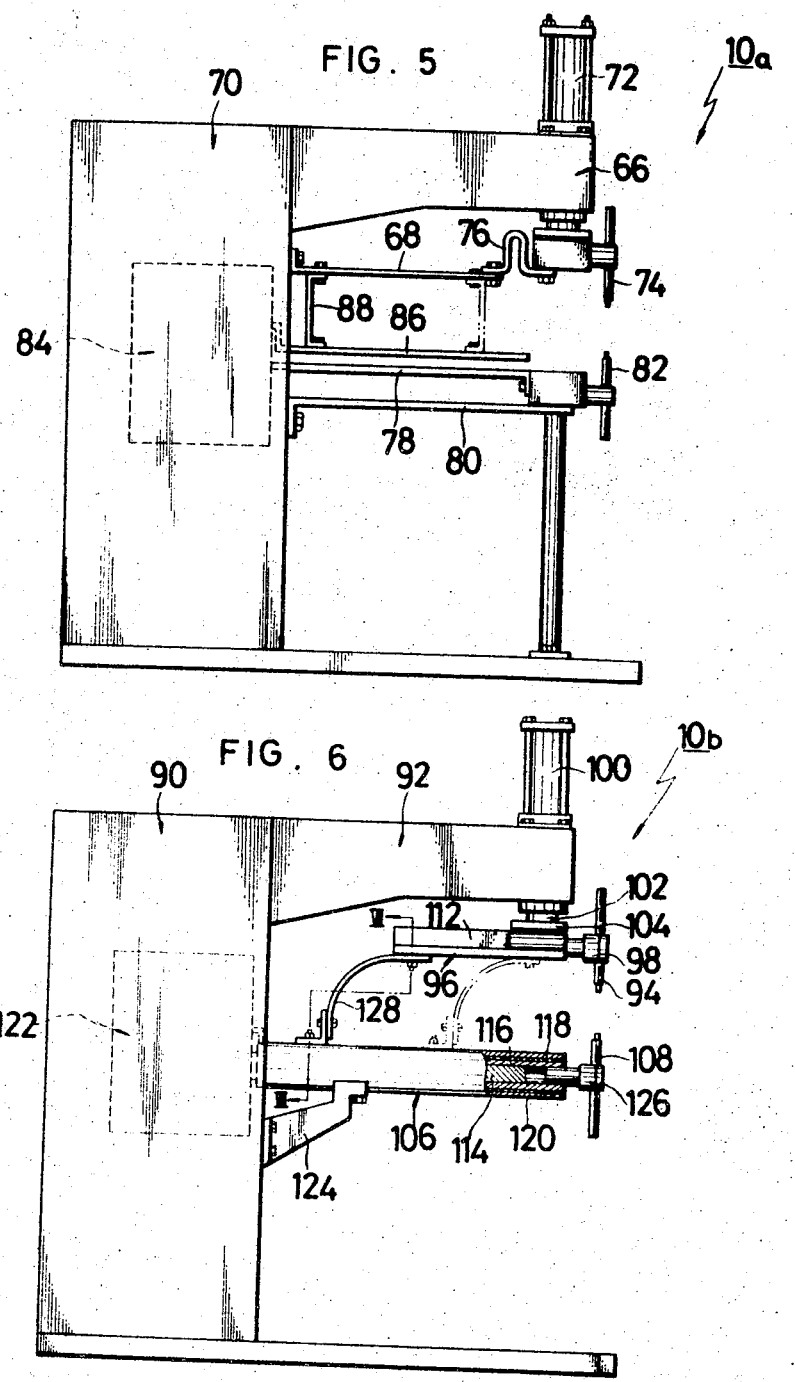

INVENTOR.
Ryoda Sato

Patented July 3, 1973 3,743,816

INVENTOR.
Ryoda Sato

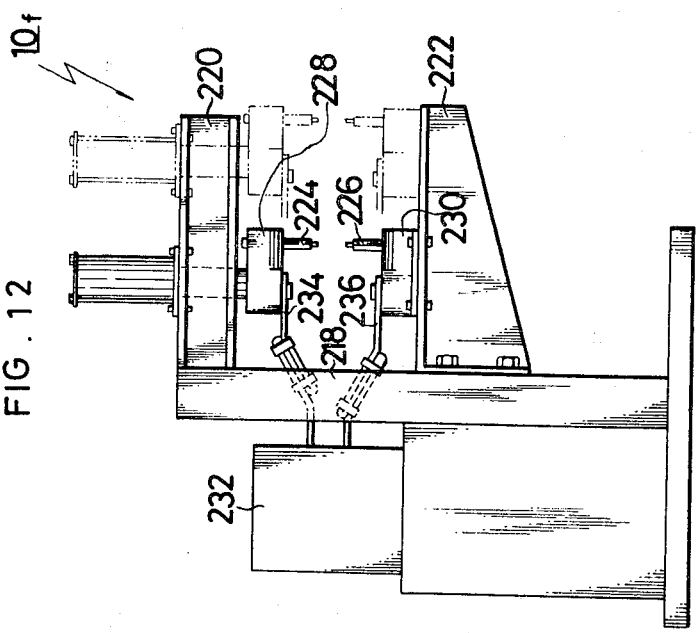
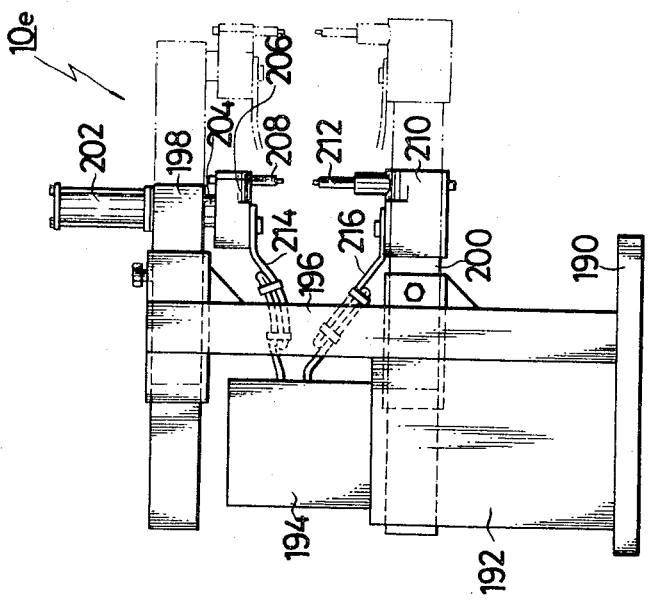

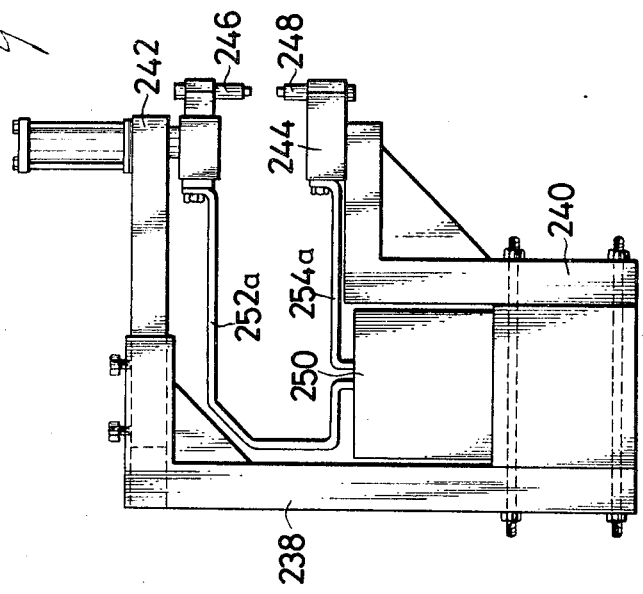
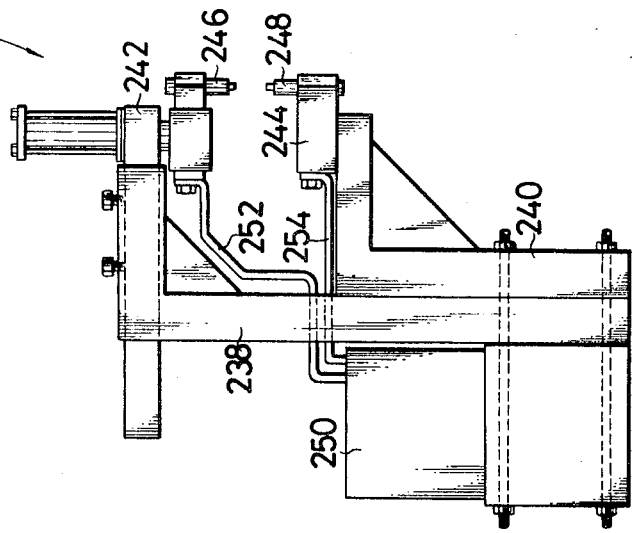

RESISTANCE-TYPE SPOT WELDING MACHINE

The present invention relates generally to metal welding machines, such as resistance-type spot welding machines, more particularly to a power supply mechanism which connects a welding transformer, lodged in a machine body, with upper and lower electrodes, supported at the free ends of upper and lower arms, projecting from said body.

In conventional resistance welding machines the welding transformer is connected with the upper and lower electrodes through rigid power supply conductors guided along upper and lower arms. The length of arms or longitudinal dimension of the operative space is inherent and unchangeable for a given welding machine and thus incapable to be adjusted corresponding to the configuration and dimensions of the articles to be welded. A large longitudinal dimension means a large space along the surrounding power supply circuit defined between the upper and lower arms and between the upper and lower electrodes, thus means a large power loss during the welding operation by an impedance drop caused by an increase in the reactance of said power supply circuit. Hence, when the welding is carried out by employing a resistance welding machine having an unnecessarily large longitudinal dimension or distance of the operative space for the articles to be welded requiring substantially no longitudinal dimension or distance of the space, the welding efficiency is very low. Accordingly, it is an object of the present invention to provide an improved welding machine, the longitudinal dimension and distance of which is adjustable corresponding to the configuration and dimensions of the articles to be welded and which is capable to minimize shortcomings such as power loss due to the impedance drop between the operative space, negative effect on the load due to the lower power factor and the like and to improve the welding capacity as compared with such a conventional resistance welding machine that the welding is carried out at a constant longitudinal dimension and distance of the operative space, irrespective of the configuration and dimensions of the articles to be welded.

Other objects, features and advantages of the present invention will be apparent from the following disclosure, claims and the appended drawings, wherein:

FIG. 1 is a side view of a first embodiment of the present invention.

FIG. 2 is an enlarged sectional view in part taken substantially along line II—II in FIG. 1.

FIG. 3 is an enlarged sectional view in part taken substantially along line III—III in FIG. 2.

FIG. 4 is a schematic view of power supply circuit to the electrodes of the machine shown in FIG. 1.

FIG. 5 is a side view of another embodiment of the present invention.

FIG. 6 is a side view of a third embodiment of the present invention.

FIG. 11 is a side view of a sixth embodiment of the present invention.

FIG. 12 is a side view of a seventh embodiment of the present invention.

FIG. 13 is a side view of an eighth embodiment of the present invention.

FIG. 14 is a side view illustrating another useage of the embodiment shown in FIG. 13.

Figure 8:
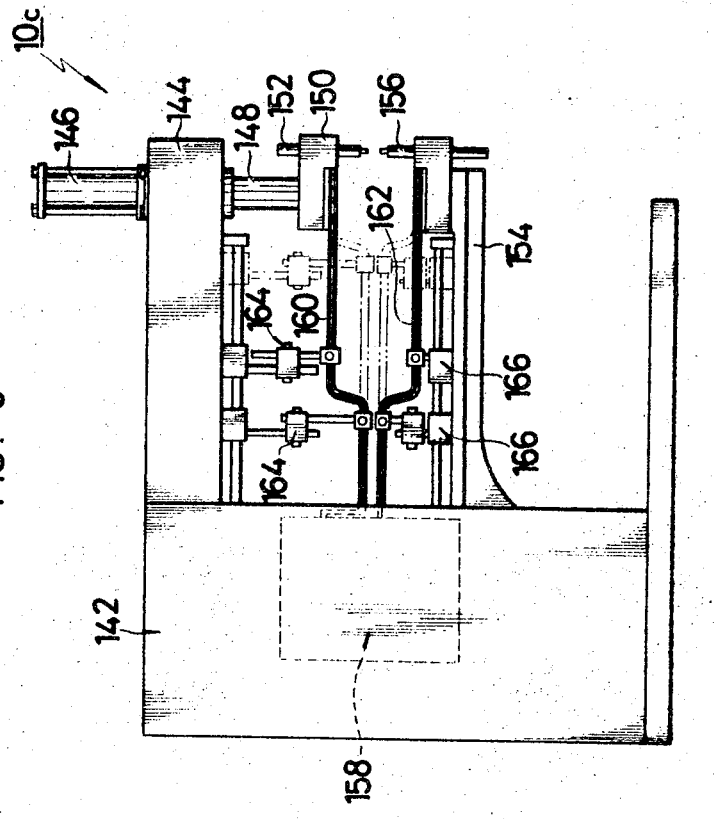
FIG. 8 is a side view of a fourth embodiment of the present invention.

Referring to the drawings, the welding machine according to the present invention is generally shown at 10 in FIG. 1. A transformer 14 is mounted on a box-type body member 12. An upper arm 16 and a lower arm 18 project from said body member 12, substantially facing each other. An upper electrode 20 is supported on the upper arm 16 at the vicinity of the end thereof and a lower electrode 22 on the lower arm 18 at the vicinity of the end thereof, respectively.

The upper electrode 20 is detachably fixed by means of an electrode horn 26 on a supporting arm 24 at the vicinity of the end thereof, which arm is arranged along the upper arm 16 and comprises a material of good electric conductivity. The supporting arm 24 is connected in an electrically insulating relation with the upper arm 16 by means of a rod 30 of a pressurizing or hydraulic system 28 such as an air cylinder mounted on the arm 16 at the vicinity of the end thereof and with a base plate 32 in such a manner that the upper electrode 20 is movable upwards and downwards relative to the lower electrode by the forward and backward motion of the rod 30. On the other hand, the lower arm 18 is constructed integrally of two high conductive power supplying conductor rods 34, 36 arranged in parallel intervened by an insulator 38. The lower electrode 22 is fixed detachably at the end of the conductor 36, the lower part of the lower arm 18 by means of an electrode horn 40.

The conductor rods 34, 36 are respectively connected to terminals of the secondary winding of the transformer 14. Between the upper rod 34 and said supporting arm 24, there is provided a flexible connector 42 which is composed, for example, of thin copper bands piled together in an appropriate number in order to connect electrically the connector rod 34 and arm 24 respectively. As shown in FIG. 2, the connection of the connector 42 with the supporting arm 24 and with the rod 34 is effected so as to fix both in any desired position by means of bolts 48, 50 and nuts 52, 54 inserted respectively in longitudinal elongated slots 44, 46 provided on the bottom of the supporting arm 24 and the upper face of the rod 34 respectively. In the case of rods 34, 36 arranged in a parallel relation on the same plane, the connection may be effected in the same manner as in the above case when the rods are arranged in a vertical relation. Alternatively, the connection of the connector 42 with the supporting arm 24 and with the rod 34 is equally effected by fastening the bolts selectively inserted through one of tapped holes provided longitudinally in series in the respective members.

A supporting rod 56 receiving the lower arm 18 is arranged vertically so as to be removable longitudinally along the lower arm 18 by means of one set of bases 58 (see FIG. 3) provided at the lower part of the body 12. As shown in FIG. 3, the supporting rod 56 is connected with the bases by means of a bar plate 60 provided at the bottom of the rod 56 in such a manner that the bar plate 60 is fixed at any desired position by inserting bolts 64 or the like through slots 62 extending longitudinally provided in the base plates 58.

How to operate the welding machine will now be illustrated. When voltage is applied to the primary winding of the transformer 14 and members of an article to be welded are inserted between the upper and lower electrodes 20, 22, if the article requires substantially no longitudinal dimension of the operative space, then the connector 42 is temporarily transferred to a position on rod 34 as shown in the dotted lines in FIG. 1 by unfastening the nuts 52, 54, guiding the connector 42 along the slots 44, 46 of arm 24 and rod 34, respectively by means of the bolts 48, 50 and fastening again the nuts 52, 54 to fix the connector 42 at the proper position.

The current will then flow as shown by arrows in FIG. 4. In this case, the current will flow in the opposite direction within the two coextensive but insulated bars 34, 36 between the lower part of the connector 48 42 and the transformer 14 to compensate the reactances between the range of each other, resulting in the reduction of power loss within the range of the operative space and in an improvement of the welding capacity.

FIG. 1 shows the lower arm 18 comprising integrally the two conductor bars 34, 36 in order to compensate the reactances caused by flowing of the current in the opposite directions within the bars 34, 36. Hence the same effect can be naturally achieved by forming integrally the lower arm 18 by arranging a plurality of conductor bars in parallel, in which case, the number of connectors should be, of course, increased properly corresponding thereto.

Additionally, since the lower supporting rod 56 in the welding machine 10 can be fixed at any desired position along the longitudinal direction of the lower arm 18, when the periphery of a deep box or the like is to be welded, the operation is easily and surely effected by merely transferring the supporting rod 56 of the lower arm to a position nearer to the base side of the lower arm 18 as shown by the dotted lines in FIG. 1.

The second embodiment of the present invention will be now illustrated with reference to FIG. 5. The welding machine of the second embodiment is shown generally with reference number 10a. In the welding machine 10a, an upper power supplying conductor 68 is provided under an upper arm 66 in parallel and electrically insulated relation to a body member 70. An upper electrode 74 is connected to a pressurizing system 72 and fixed by means of a flexible conductor 76 at the vicinity of the end of the arm 66. On the other hand, a lower power supplying conductor 78 is arranged along a lower arm 80 and connected to a terminal of the secondary winding of a transformer 84, at the end of the lower arm 80, a lower electrode 82 being fixed in facing relationship with said upper electrode 74. A secondary power supplying conductor 86 positioned above the lower power supplying conductor 78 is connected with another terminal of the secondary winding of the transformer 84 and arranged adjacently in parallel to and in electrically isolated relations to said conductor 78. There is provided a connector 88 which can be fixed at any desired position along the longitudinal direction of and between said lower and upper conductors 86 and 68, electrically connected with these conductors 86, 68.

Alternatively, the connection between the transformer 84 and the lower electrode 82 may be effected by utilizing the lower arm 80 itself without providing additionally with the lower conductor 78, in which case the secondary power supplying conductor 86 is naturally adjacent and in parallel to the lower arm 80.

In the operation of the welding machine 10a, when an article requires substantially no longitudinal dimension of the operative space, the current is made to flow at the instant of the welding operation at the position shown by the dotted lines in FIG. 5 from the transformer 84 via the secondary power supplying conductor 86, connector 88, upper power supplying conductor 68 and flexible conductor 76 through the upper electrode 74, the article to be welded and the lower electrode 82 to return to the transformer 84 via the lower power supplying conductor 78. Thus the reactances caused in the range between the lower power supplying conductor 78 and the secondary power supplying conductor 86 compensate each other because of the opposite directions of the current within the range to reduce the power loss caused by the reactance drop.

Accordingly, by adjusting the longitudinal dimension of the operative space by transferring and fixing the connector 88 at any desired position depending on the configuration and dimensions of an article to be welded, the range wherein the current flows in opposite directions can be adjusted between the lower power supplying conductor 78 and secondary conductor 86, resulting in a reduction of power loss and an improvement of the welding capacity. This relation between conductors 78, 86 is of course similar to that described in connection with FIG. 4 for the corresponding conducting members 36, 34 of the first embodiment.

The following is the third embodiment of the present invention illustrated with reference to FIGS. 6 and 7. The welding machine of the third embodiment is generally indicated at 10b. An upper electrode 94 is supported on an upper arm 92 projecting from a body member 90 at the neighborhood of the end thereof and fixed detachably by means of an electrode horn 98 at the vicinity of the end of an electrode supporting arm 96 provided along the upper arm 92 substantially in the same manner as in the welding machine 10 shown in FIG. 1. The supporting arm 96 is connected in an electrically insulated relation with a rod 102 of a pressurizing system 100 as an air cylinder or the like mounted at the vicinity of the end of the arm 92 and with a base plate 104 so as to be movable relative to a lower electrode 108 provided at the vicinity of the end of a lower arm 106 referred to hereinafter by the forward and backward motion of the rod 102. Additionally, the supporting arm 96 includes in the center an iron core 110 and is composed integrally by fitting a tubular member 112 of a high conductive material such as brass or the like around the periphery of the core as shown in an enlarged sectional view thereof in FIG. 7.

Figure 7:
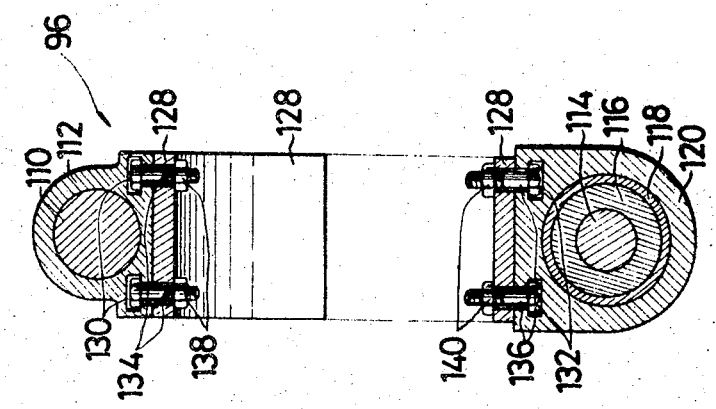
FIG. 7 is a sectional view in part taken substantially along line VII—VII in FIG. 6.

As shown in FIG. 7, the arm 106 also includes in its center an iron core 114 and is composed integrally by fitting an inner tubular power supplying conductor 116 of a high conductive material around the periphery of the core 114, an intermediate insulating tubular member 118 around the outer periphery of the member 116 and an outer tubular power supplying conductor 120 of a high conductive material around the outer periphery of the insulating member 118. One end of the arm 106 protrudes inwards through the front wall of the body member 90 so as to connect the inner tubular conductor 116 and outer tubular conductor 120 with terminals of the secondary winding of a transformer 122 respectively. The arm 106 is supported appropriately by means of a bracket 124 extending from the body member 90. On the other hand, there is provided in the arm 106 a hollow portion without the iron core 114 at the other end of the arm 106, the lower electrode 108 being fixed by means of an electrode horn 126 of a high conductive material supported in the hollow portion. A flexible connector 128 is provided between the outer tubular conductor 120 of the lower arm 106 and the tubular member 112 of the upper arm 96 to connect electrically the conductor 120 and the tubular member 112 and constructed so as to be fixed at any desired position by fastening bolts 134, 136 inserted through slots 130, 132 provided along the longitudinal directions of the bottom face of the tubular member 112 and the top face of the tubular conductor 120 respectively with nuts 138, 140 respectively.

The connecting position of the connector 128 is also adjustable in the welding machine 10b as referred to hereinbefore depending on the operating conditions. Since the current flows in the opposite directions within the inner and outer tubular conductors 116, 120, the reactances compensate each other to reduce the power loss in the unnecessary region of the operative space. At the same time, since the lower arm 106 is markedly increased in strength due to the installed iron core 114 in the innermost part of the lower arm 104 as compared with the lower arm of the same diameter without the core, the bracket 124 can be substantially smaller than those of conventional welding machines, resulting not only in the possibility of the welding operation for the vicinity of the bottom of cylindrical articles with smaller diameter and framed articles which have been impossible to be welded by the use of conventional welding machines, but also in the reduction of magnetic effects caused by the bracket 124 when any current flows through the lower arm 106 and in the reduction of power loss.

The following is an illustration of the fourth embodiment of the present invention with reference to FIG. 8, shown at 10c. At one end of an upper arm 144 projecting from a body member 142, there is provided an upper electrode 152 connected by means of a rod 148 of a pressurizing system 146 and an electrode horn 150 and constructed so as to be transferred relative to a lower electrode 156 provided at the vicinity of the end of a lower arm 154. Flexible upper and lower power supplying conductors 160, 162 are arranged in parallel relation to each other between the upper and lower electrodes 152, 153 and a transformer 158 installed within the body member 142. An upper power supplying conductor 160 is supported by a plurality of supports 164; similarly a lower power supplying conductor 162 by a plurality of supports 166; the supports 164, 166 is adjustable in length and supported midway by the upper and lower arms 144, 154 respectively.

In the above mentioned fourth embodiment, the upper and lower power supplying conductors are both composed of a flexible material, but the same effect as mentioned above can be achieved when only one of the conductors is composed of a flexible material, while the other is fixed on the upper or lower arm.

Figure 9:
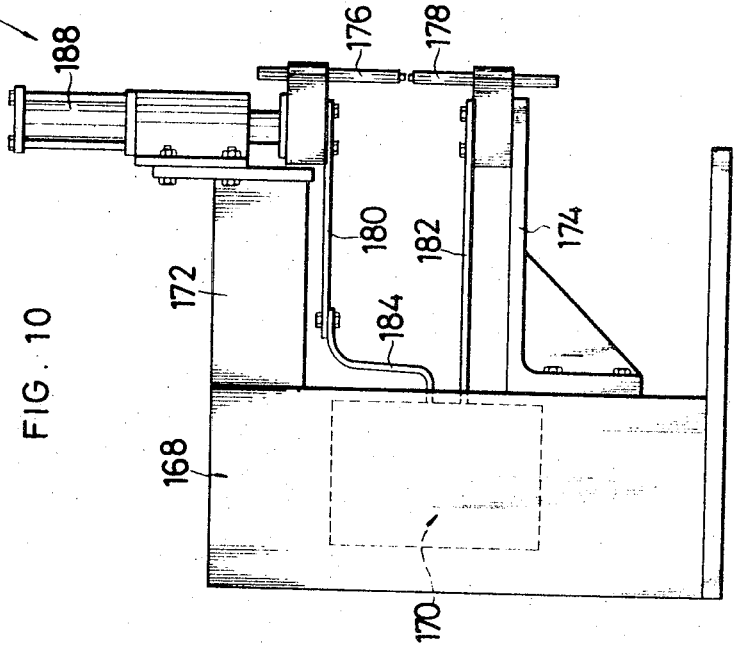
FIG. 9 is a side view of a fifth embodiment of the present invention.
Figure 10:
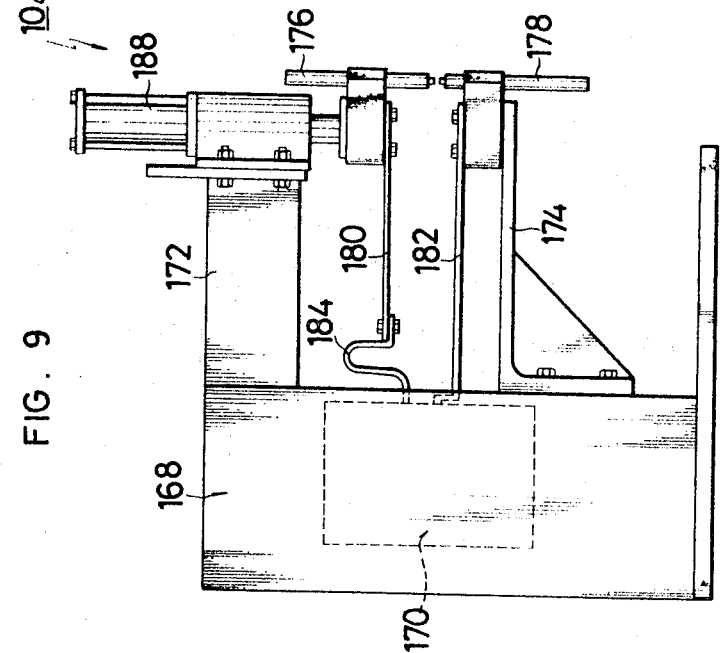
FIG. 10 is a side view illustrating the usage of the machine shown in FIG. 9.

In the fifth embodiment of the present invention as illustrated in FIGS. 9 and 10, a welding machine 10d includes, in an arrangement similar to the previously described ones, a body member 168, a transformer 170, an upper arm 172, a lower arm 174, a upper electrode 176, a lower electrode 178, an upper power supplying conductor 180, a lower power supplying conductor 182, a flexible conductor 184 and others. A pressurizing system 188 of the welding machine 10d is composed so as to be fixed at any desired position in vertical relation to the upper arm 172. The upper power supplying conductor 180 can approach the lower power supplying conductor 182 through the adjustment of the position of the pressurizing system 188 to a condition of less reactance for the reduction of power losses.

The sixth embodiment of the present invention will now be described with reference to FIG. 11. A welding machine of the sixth embodiment is identified by 10e. A transformer 194 is supported on a base 192 mounted on a common base 190. A central pillar 196 stands also on the common base 190. Upper and lower arms 200 are fixed longitudinally slidably, at the upper and midway parts of the pillar 196, respectively. There is provided at the vicinity of the upper arm 198 an upper electrode 208 connected therewith through a rod 204 of a pressurizing system 202 and an electrode horn 206. A lower electrode 212 is fixed at the vicinity of the ed of the lower arm 200 through an electrode horn 210. The electrodes 208, 212 are connected electrically with the transformer 194 by means of flexible and expandable upper and lower power supplying conductors 214, 216 such as plaited cords, respectively.

In the operation of the welding machine as referred to the sixth embodiment, the upper arm 198 and lower arm 200 are fixed respectively at any desired positions along their longitudinal directions so as to make the upper and lower electrode 208, 212 approach the transformer 194. The flexible upper and lower power supplying conductors 214, 216 are respectively folded up. The power loss caused by unnecessary operative space is reduced by folding up the flexible upper and lower power supplying conductors 214, 216 so as to provide minimum electric passage between the respective electrodes and the transformer 194.

As referred to before, the upper and lower power supplying conductors 214, 216 may be composed of an expandable conductive material. Alternatively, new conductors of appropriate sizes may be replaced for the old members so as to connect electrically within a minimum distance between the electrodes 208, 218 and the transformer 194.

Alternatively, in another embodiment of such a type as shown generally FIG. 12 at 10f, an upper arm 220 and a lower arm 222 may project from a main pillar 218. Electrode horns 228, 230 supporting the respective electrodes 224, 226 may be respectively fixed slidably along the longitudinal directions of the upper and lower arms, 220, 222. The upper and lower electrodes 224, 226 may be connected respectively with a transformer 232 by means of flexible and expandable upper and lower power supplying conductors 234, 236.

Alternatively, in a further embodiment 10g shown in FIGS. 13 and 14, upper and lower arms 242, 244 may be slidably fixed on respective horizontal supports bracketed from substantially perpendicular to a main pillar 238 and a auxiliary pillar 240 which is lower than said main pillar at the top of the arms. Upper and lower electrodes 246, 248 are fixed at the ends of said upper and lower arms respectively in fact to face relation and connected electrically with a transformer 250 by means of power supplying conductors 252, 254 in the welding machine shown in FIG. 13 or 252a, 254a in the welding machine shown in FIG. 14. The distance from the transformer 250 to the upper or lower electrode 246 or 248 may be selectively adjustable by fixing detachably said main pillar 238 and auxiliary pillar 240 either both on one side as shown in FIG. 13 or on opposite side as shown in FIG. 14 of the transformer 250 so as to achieve the same effect as mentioned above.

Figure 15:
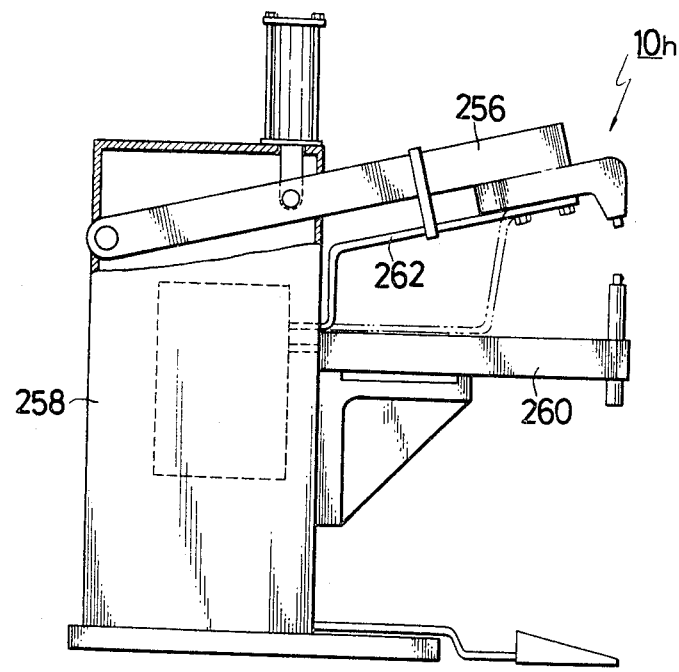
FIG. 15 is a side view, sectional in part, of the present invention when applying to a welding machine of rocker arm type.

Moreover, the present invention may be applied to a welding machine 10h of a rocker arm type as shown in FIG. 15 wherein an upper arm 256 is pivotably mounted relative to a body member 258. FIGS. 10 and 11 relate to the adjustment of the depth and of the spacing, respectively, and it will be clearly appreciated that both mechanisms can be embodied at the same time. As a consequence, the space defined by the electrodes and the associated power-supplying conductors can have their depth or spacing or a combination thereof adjusted. This is an embodiment similar to that described as a possible alternative to the fourth embodiment referred previously to (see FIG. 8) wherein a lower arm 260 serves as a fixed lower power supplying conductor and only the upper power supplying conductor 262 is composed of a flexible material.

I claim:

1. A resistance-type spot welding machine comprising, in combination, a pair of arms, a pair of juxtaposed electrodes supported by said arms, a transformer for energizing said electrodes with welding current, a pair of power supplying conductor means providing connections between said transformer and said electrodes, means operable to adjust at least one of the depth and the spacing of an operative space defined by said electrodes and said conductor means for the articles to be welded, and an adjusting mechanism operable to allow said conductor means to have the smallest spacing therebetween so that parallel portions thereof are elongated as far as possible in the depthwise direction, thereby to reduce the welding impedance and power losses, and to increase the power factor.

2. The welding machine as defined in claim 1, further comprising a pair of electrically independent conducting bars for said electrodes, positioned in parallel and adjacent with one another, while having each one end connected to said transformer, one of said electrodes being positioned on the leading end of one of said bars, a supporting arm electrically connected to the other of said electrodes, and a connector electrically connecting said supporting arm with the other of said bars, while being selectively adjustable in its position in the longitudinal direction of said bars.

3. The welding machine as defined in claim 1, further comprising a pair of electrically independent conducting members, positioned in parallel and adjacent with one another, while having each one end connected to said transformer, one of said electrodes being positioned on the leading end of one of said members, a first conductor connected through a flexible conductor to the other of said electrodes, and a connector electrically connecting said first conductor with the other of said members, while being selectively adjustable in its position in the longitudinal direction of said members.

4. The welding machine as defined in claim 1, further comprising a pair of electrically independent conductor means arranged concentrically and cylindrically and having each one end connected to said transformer, and a cylindrical member insulating said conductor means.

5. The welding machine as defined in claim 4, further comprising a columnar iron core received in an inside bore section of one of said conductor means.

6. The welding machine as defined in claim 1, further comprising a pair of conductors each having one end connected to said transformer, the other ends being connected to said electrodes, at least one of said conductors being formed of a good conductive flexible material, and support members by which the distance between said conductors is adjustable to be as small as possible on the transformer side, and to correspond to the configuration of the articles to be welded on the electrode side.

7. The welding machine as defined in claim 1, further comprising a main column, an upper arm mountable at a lengthwise position thereof, a secondary column, a lower arm disposed on the latter downwardly of said upper arm, said columns being removably mounted on at least the front wall of said transformer, said electrodes being supported by said arms, and a power-supply conducting member electrically connecting said electrodes with said transformer.

* * * * *